(12) United States Patent
Chadalapaka

(10) Patent No.: US 6,845,403 B2
(45) Date of Patent: Jan. 18, 2005

(54) SYSTEM AND METHOD FOR STORAGE VIRTUALIZATION

(75) Inventor: Mallikarjun B Chadalapaka, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 291 days.

(21) Appl. No.: 09/999,026

(22) Filed: Oct. 31, 2001

(65) Prior Publication Data

US 2003/0084209 A1 May 1, 2003

(51) Int. Cl.$^7$ .............................................. G06F 3/00
(52) U.S. Cl. ........................ 710/5; 710/7; 710/74; 710/105; 711/111; 711/112
(58) Field of Search ..................... 710/5–7, 74, 105, 710/111–114, 305–317; 711/111–114

(56) References Cited

U.S. PATENT DOCUMENTS 5,293,624 A * 3/1994 Andrade et al. ............... 710/5
6,115,772 A * 9/2000 Crater ......................... 710/306

OTHER PUBLICATIONS

Cisco System, iSCSI Protocol Concepts and Implementation, May 2001, pp. 1–12.*
Yaron Klein, Storage Virtualization with iSCSI Protocol, Nov. 2, 2000, pp. 1–15.
J. Satran, etal., iSCSI, Dec. 30, 2000, pp. 1–89.

* cited by examiner

Primary Examiner—Jeffrey Gaffin
Assistant Examiner—Mike Nguyen

(57) ABSTRACT

The present invention is generally directed to a system and method for virtualizing storage in a networked system. In accordance with one aspect of the invention, in a system having an initiator and at least one storage device, an inventive method determines, based upon a SCSI command received by a manager from the initiator, which of the data storage devices are implicated by the SCSI command. The method then forms an iSCSI command that is sent from the manager to each of the implicated storage devices, and receives at the manager an iSCSI response from each of implicated storage devices, after each of the storage devices has completed its implicated data transactions with the initiator. Finally, the method forms a SCSI response that is sent by the manager to the initiator. A corresponding system is also provided.

23 Claims, 10 Drawing Sheets

SYSTEM AND METHOD FOR STORAGE VIRTUALIZATION

BACKGROUND OF THE INVENTION

1. Field of the Invention

The present invention generally relates to networked computer and storage systems, and more particularly to a system and method for implementing storage virtualization.

2. Discussion of the Related Art

Storage virtualization refers to hiding or masking a physical storage device from a host server or application. In this regard, the relationship of virtual storage to a network is conceptually similar to the relationship of virtual memory to a single system.

With virtual memory management, complex applications become easy to implement. The same is realized in virtual storage management, except that rewards are potentially greater in storage virtualization. Solutions to storage management problems have high business value. Virtualization of persistent storage enables storage management functions great flexibility in distributing data throughout a network of diverse storage devices and reconfiguring network storage as needs change.

Some of the benefits of storage virtualization include the ability to: isolate applications from underlying physical devices, improve availability and maintainability of systems, expand storage on the fly, reduce downtime for backup and other maintenance functions, migrate data from systems and applications, support large, high performance storage applications, mix and match various storage devices for investment protection, support advanced storage applications such as replication, and support larger storage devices than are physically possible.

As is known, iSCSI refers to a protocol, which is a mapping of the SCSI remote procedure invocation model on top of the TCP protocol. Various ways have been proposed to accomplish virtualization in iSCSI, including: (1) implementing virtualization in the host, in a layer above the iSCSI; (2) through an external server that interacts with the physical storage nodes; (3) through third party add-ons or proprietary protocols; and (4) defining virtualization in the iSCSI protocol.

Implementing virtualization layer in the host above the iSCSI is believed to gain some benefits in a single host environments. However, in multi-host networks it may suffer from coherency problems. An external server that manages the storage nodes can implement virtualization in the current iSCSI framework. However, this solution has disadvantages such as data being transferred twice in each transaction (from node to server and from server to host), and the server thus becomes a bottleneck. Third-party protocols or proprietary protocols can implement virtualization. However, to gain interoperability with an iSCSI protocol, it is preferable to use a standard protocol.

Storage virtualization through an iSCSI protocol has also been proposed. In this regard, reference is made to FIG. 1, which illustrates certain systems element in a hypothetical virtual storage system. The illustrated system includes two hosts 10 and 12, two managers 20 and 30, and two sets of stores A1–An 22 and 24, and B1–Bn 32 and 34. The various components communicate across a network 40. The illustrated system includes two storage groups: one defined by manager A 20 and stores A1–An 22 and 24, and another defined by manager B 30 and stores B1–Bn 32 and 34.

As is known, an iSCSI store is a physical storage element (e.g., disk, gateway to disks, etc.) that attaches to the network 40 with an iSCSI protocol. Such a store has linear space and is defined by a store identifier (which provides a unique identifier to the store), metadata (which describes properties of the store), a class of service (which specifies availabilities, cost, performance and security), and a storage group (which is a collection of one or more stores).

The storage manager is a software entity, attached to the network 40 and provides data access and management control to one or more storage groups. The connection/communication among the elements in the system is via the iSCSI protocol. The elements in the system have the following interfaces to each other: The host has an (iSCSI) initiator interface to the manager and to the stores. The manager has a target interface to the host and an initiator interface to the stores. The stores have target interfaces toward the manager and the host.

The manager interface includes SCSI commands and data. As is known, the iSCSI protocol encapsulates SCSI commands and responses from initiator to the target and vice versa. A host initiates SCSI commands only to the manager, and the manager replies with iSCSI status message response that includes header and attached data. The attached data contains iSCSI commands and stores that the host issues. At the end of each phase, the store sends the status message to the host and the manager.

Reference is made briefly to FIG. 2, which illustrates the messages' flow in case of SCSI read command. As illustrated, in a system with a host 50, a manager 60, and one or more disks (e.g., disk A, disk B, etc.) 70, the host 50 may initiate the process with a SCSI command, to which the manager 60 responds with a SCSI status message, as well as commands for the various disks. The host then, individually communicates these commands to the disks. After communicating each command, each disk will provide SCSI data (if appropriate), and a SCSI status or reply message).

By way of a more definitive example, consider a system having virtual group A that is constructed from a manager and three stores: Disk A1, Disk A2 and Disk A3. Assume further that each store contains 1000 blocks. Thus, the virtual group reflected to the host contains 3000 blocks. Assume, for purposes of this example, that the virtual address space spanning addresses 500 and 600 is physically distributed as illustrated in FIG. 3A (e.g., virtual addresses 500–509 are physically located on Disk A1 from 100–109, virtual addresses 510–519 are physically located on Disk A2 from 200–209, etc.). Assume further that a host (initiator) 50 desires to read virtual addresses 500–600.

Although not specifically illustrated, the first phase of the process is the login phase. At this point, the host 50 is only aware of the manager. Thus, the host initiates the login process by sending an iSCSI login request to the manager 60, as if the manager 60 was a simple target. The host 50 and manager 60 establish a new session (negotiating parameters, authenticating each other, etc.). If the login phase ends successfully, the manager 60 sends a login response message with "login accept" as a status. This message has an attachment in the data part that includes the list of stores in the group and their IP address.

This ends the login phase between the host and the manager. Thereafter, the host initiates a login session with each store in the group to establish separate sessions with each. Once a session has been established between the host (initiator) and each of the stores (targets), then SCSI commands (between the host and manager) may be carried out.

In keeping with the example in which the host 50 wishes to read 100 memory blocks (or logical units) from the virtual volume spanning virtual addresses 500–600, then the host must send individual commands to each of the respective stores 74, 76, etc. A portion of this process is illustrated in FIG. 3B. In this regard, the host 50 first sends a SCSI read command to the manager 60, informing the manager that the host wishes to read 100 blocks (or logical units) beginning at virtual address 500. The manager replies to the host by informing the host of the physical address of each of the desired blocks (or logical units). Thereafter, individualized SCSI read commands are sent to the respective stores 74, 76, etc. to read these blocks.

A first such command is sent to disk A1 74, requesting to read the 10 blocks beginning at address 100. Then, the data is send from disk A1 74 to the host 50. Then, the disk A1 74 sends a SCSI status to the host 50. Similarly, the host 50 then reads the next blocks, which are stored on disk A2 76. It does this by sending a SCSI read command to disk A2 76, requesting to read the 10 blocks beginning at address 200. Then, the data is sent from disk A2 76 to the host 50. Then, the disk A2 76 sends a SCSI status to the host 50. This process is continued until the entire 100 blocks of data have been sent to the host 50.

It has been found that this approach results in various inefficiencies. For example, the input/output (I/O) load (interrupts, reads, writes) on the host increases exponentially wit the number of managers the host is interfacing with. The I/O load also increases with the number of stores that each manager is virtualizing. Further, each manager virtualizing the storage operates more like a look table of storage devices than being a true virtualizing entity.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to a system and method for virtualizing storage in a networked system. In accordance with one aspect of the invention, in a system having an initiator and at least one storage device, an inventive method determines, based upon a SCSI command received by a manager from the initiator, which of the data storage devices are implicated by the SCSI command. The method then forms a forwarding command (preferably an iSCSI command) that is sent from the manager to each of the implicated storage devices, and receives at the manager a response to its forwarding command (preferably an iSCSI response) from each of implicated storage devices, after each of the storage devices has completed its implicated data transactions with the initiator. Finally, the method forms a SCSI response that is sent by the manager to the initiator.

In accordance with another aspect of the invention, a system having logic components for carrying out the foregoing method steps is also provided.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
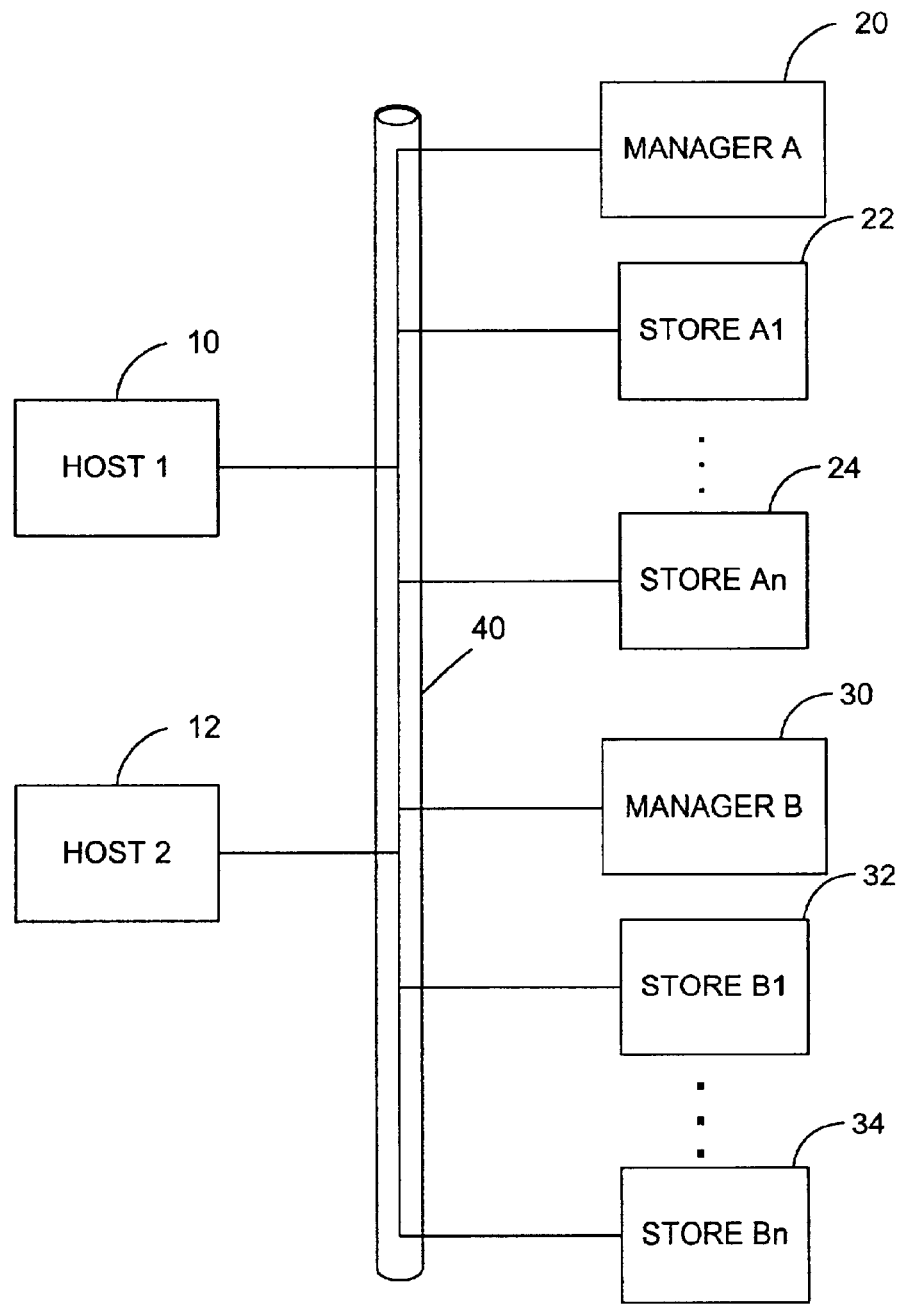
FIG. 1 is a diagram, which illustrates certain systems element in a hypothetical virtual storage system.
Figure 2:
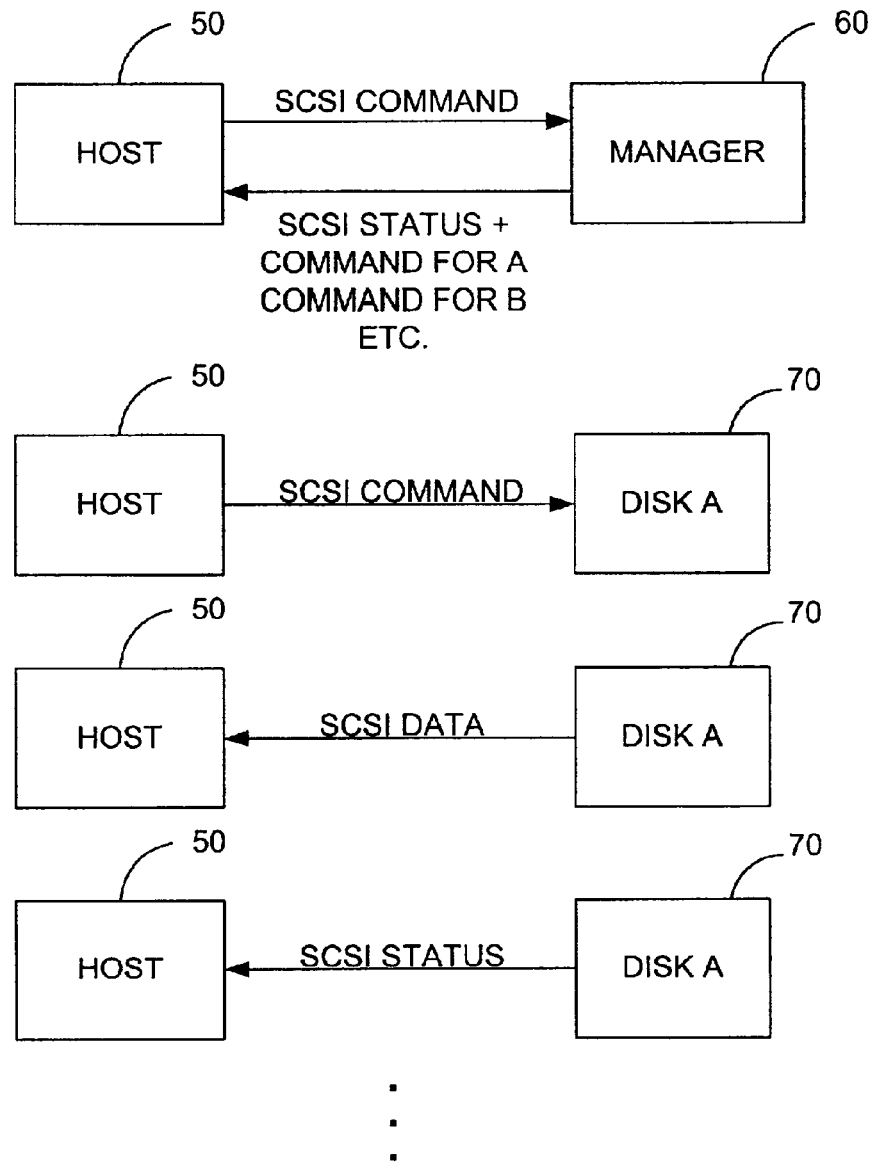
FIG. 2 is a diagram, which illustrates a message flow of a SCSI Read command.
Figure 3A:
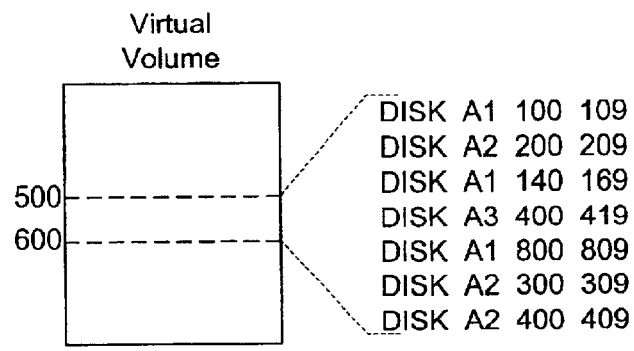
FIG. 3A is a block diagram illustrating the partitioning/addressing of a virtual volume, containing storage from three different physical drives.
Figure 3B:
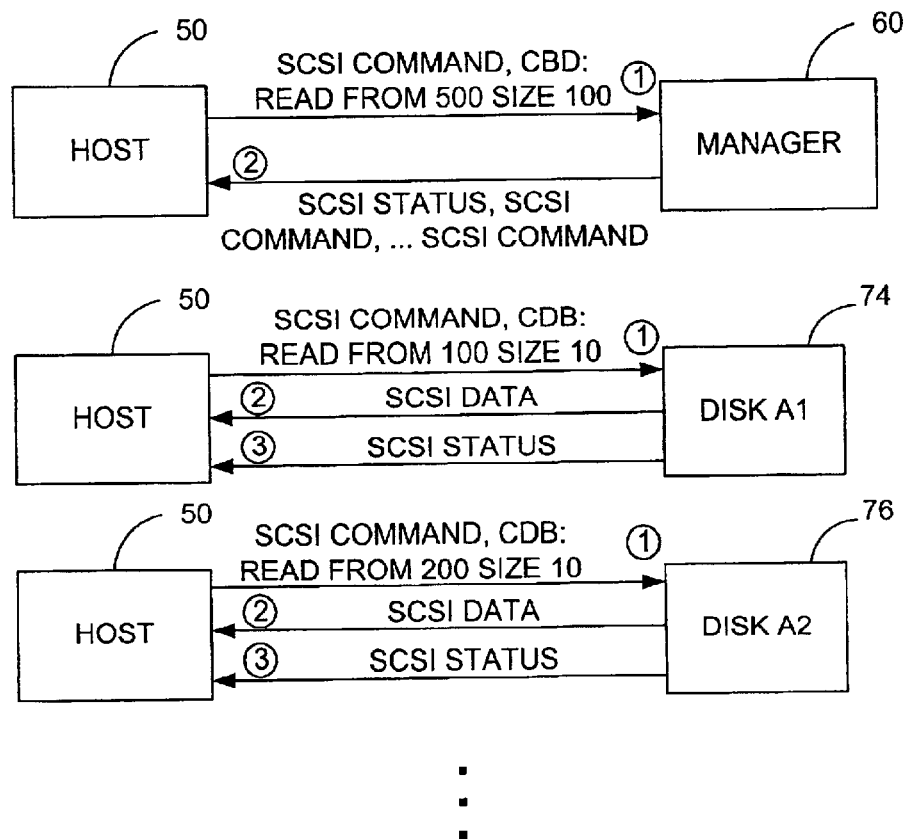
FIG. 3B is a block diagram illustrating certain messaging exchanges between a host and a manager and disks, in connection with a Read of data from the virtual volume of FIG. 3A.

Having summarized various aspects of the present invention above, reference will now be made in detail to the a preferred embodiment of the present invention. Before discussing the inventive embodiments, however, a preliminary discussion will first be presented on the iSCSI protocol. In this respect, it is noted that the present invention is not deemed to be limited to the particular iSCSI protocol, but rather to a protocol that is structured similar to that presented in the discussion that follow. Indeed, the iSCSI protocol has not yet been standardized, and the actual/standardized protocol may differ from that presented below. The discussion below is therefore intended only to be illustrative, and not limiting on the invention.

iSCSI Protocol

Documents, such as the SCSI Architecture Model-2 (SAM-2) are known to describe in detail the architecture of the SCSI family of I/O protocols. This section provides only a brief background to illustrate certain basic features and concepts of the SCSI architecture, as other documents are available to provide a more detailed discussion.

At the highest level, SCSI is a family of interfaces for requesting services from I/O devices, including hard drives, tape drives, CD and DVD drives, printers, and scanners. In SCSI parlance, an individual I/O device is called a "logical unit" (LU). SCSI is a client-server architecture. Clients of a SCSI interface are called "initiators". Initiators issue SCSI "commands" to request service from a logical unit. The "device server" on the logical unit accepts SCSI commands and executes them. A "SCSI transport" maps the client-server SCSI protocol to a specific interconnect. Initiators are one endpoint of a SCSI transport. The "target" is the other endpoint. A "target" can have multiple Logical Units (LUs)

behind it. Each logical unit has an address within a target called a Logical Unit Number (LUN). A SCSI task is a SCSI command or possibly a linked set of SCSI commands. Some LUs support multiple pending (queued) tasks. The queue of tasks is managed by the target, though. The target uses an initiator provided "task tag" to distinguish between tasks. Only one command in a task can be outstanding at any given time. Each SCSI command results in an optional data phase and a required response phase. In the data phase, information can travel from the initiator to target (e.g. WRITE), target to initiator (e.g. READ), or in both directions. In the response phase, the target returns the final status of the operation, including any errors. A response terminates a SCSI command. For performance reasons iSCSI allows "phase-collapse"—e.g., command and its associated data may be shipped together from initiator to target and data and responses may be shipped together from targets. Command Data Blocks (CDB) are the data structures used to contain the command parameters to be handed by an initiator to a target. The CDB content and structure is defined by device-type specific SCSI standards.

The iSCSI protocol is a mapping of the SCSI remote procedure invocation model on top of the TCP protocol. In keeping with similar protocols, the initiator and target divide their communications into messages. The term "iSCSI protocol data unit" (iSCSI PDU) may be used herein when referring to these messages. iSCSI transfer direction is defined with regard to the initiator. Outbound or outgoing transfers are transfers from initiator to target while inbound or incoming transfers are from target to initiator.

Communication between initiator and target occurs over one or more TCP connections. The TCP connections carry control messages, SCSI commands, parameters and data within iSCSI Protocol Data Units (iSCSI PDUs). The group of TCP connections linking an initiator with a target form a session (loosely equivalent to a SCSI I-T nexus). A session is defined by a session ID (composed of an initiator part and a target part). TCP connections can be added and removed from a session. Connections within a session are identified by a connection ID (CID). Across all connections within a session, an initiator will see one "target image," and all target identifying elements, like LUN are the same. In addition, across all connections within a session a target will see one "initiator image". Initiator identifying elements like Initiator Task Tag can be used to identify the same entity regardless of the connection on which they are sent or received. iSCSI targets and initiators must support at least one TCP connection and may support several connections in a session.

Command numbering is session wide and is used for ordered command delivery over multiple connections. It can also be used as a mechanism for command flow control over a session. Status numbering is per connection and is used to enable recovery in case of connection failure. Data numbering is per command and is meant to reduce the amount of memory needed by a target sending unrecoverable data for command retry. Normally, fields in the iSCSI PDUs communicate the reference numbers between the initiator and target. During periods when traffic on a connection is unidirectional, iSCSI NOP-message PDUs may be utilized to synchronize the command and status ordering counters of the target and initiator. iSCSI NOP-Out PDUs are used as acknowledgements for data numbering.

iSCSI supports ordered command delivery within a session. All commands (initiator-to-target) are numbered. Any SCSI activity is related to a task (SAM-2). The task is identified by the Initiator Task Tag for the life of the task. Commands in transit from the initiator SCSI layer to the target SCSI layer are numbered by iSCSI and the number is carried by the iSCSI PDU as CmdRN (Command-Reference-Number). The numbering is session-wide. All iSCSI PDUs that have a task association carry this number. CmdRNs are allocated by the initiator iSCSI within a 32 bit unsigned counter (modulo $2^{**}32$). The value 0 is reserved and used to mean immediate delivery. Comparisons and arithmetic on CmdRN should use Serial Number Arithmetic as defined in [RFC1982] where SERIAL_BITS=32. The target may choose to deliver some task management commands for immediate delivery. The means by which the SCSI layer may request immediate delivery for a command or by which iSCSI will decide by itself to mark a PDU for immediate delivery will be understood by persons skilled in the art, and therefore need not be described herein.

CmdRNs are significant only during command delivery to the target. Once the device serving part of the target SCSI has received a command, CmdRN ceases to be significant. During command delivery to the target, the allocated numbers are unique session wide. The target iSCSI layer should deliver the commands to the target SCSI layer in the order specified by CmdRN. The initiator and target are assumed to have three counters that define the allocation mechanism—CmdRN—the current command reference number advanced by 1 on each command shipped—ExpCmdRN—the next expected command by the target—acknowledges all commands up to it—MaxCmdRN—the maximum number to be shipped—MaxCmdRN—ExpCmdRN defines the queuing capacity of the receiving iSCSI layer. The target should NOT transmit a MaxCmdRN that is more than $2^{**}31-1$ above the last ExpCmdRN. CmdRN can take any value from ExpCmdRN to MaxCmdRN except 0. The target must silently ignore any command outside this range or duplicates within the range not flagged with the retry bit (the X bit in the opcode). The target and initiator counters must uphold causal ordering. iSCSI initiators must implement the command numbering scheme if they support more than one connection per session (as even sessions with a single connection may be expanded beyond one connection). Command numbering for sessions that will only be made up of one connection is optional. iSCSI initiators utilizing a single connection for a session and not utilizing command numbering must indicate that they will not support command numbering by setting InitCmdRN to 0 in the Login command. Whenever an initiator indicates support for command numbering, by setting InitCmdRN to a non-zero value at Login, the target must provide ExpCmdRN and MaxCmdRN values that will enable the initiator to make progress.

Responses in transit from the target to the initiator are numbered. The StatRN (Status Reference Number) is used for this purpose. StatRN is a counter maintained per connection. ExpStatRN is used by the initiator to acknowledge status. To enable command recovery the target may maintain enough state to enable data and status recovery after a connection failure. A target can discard all the state information maintained for recovery after the status delivery is acknowledged through ExpStatRN. A large difference between StatRN and ExpStatRN may indicate a failed connection. Initiators and Targets must support the response-numbering scheme regardless of the support for command recovery.

Incoming Data PDUs may be numbered by a target to enable fast recovery of long running READ commands. Data PDUs are numbered with DataRN. NOP-Out PDUs carrying the same Initiator Tag as the Data PDUs are used to acknowledge the incoming Data PDUs with ExpDataRN.

Support for Data PDU acknowledgement and the maximum number of unacknowledged data PDUs are negotiated at login. In a PDU carrying both data and status, the field is used for StatRN and the last set of data blocks is implicitly acknowledged when Status is acknowledged.

The purpose of iSCSI login is to enable a TCP connection for iSCSI use, authenticate the parties, negotiate the session's parameters, open a security association protocol and mark the connection as belonging to an iSCSI session. A session is used to identify to a target all the connections with a given initiator that belong to the same I_T nexus. If an initiator and target are connected through more than one session each of the initiator and target perceives the other as a different entity on each session (a different I_T nexus in SAM-2 parlance). The targets listen on a well-known TCP port for incoming connections.

The initiator begins the login process by connecting to that well-known TCP port. As part of the login process, the initiator and target may wish to authenticate each other and set a security association protocol for the session. This can occur in many different ways and is subject to negotiation. Negotiation and security associations executed before the Login Command will be understood by persons skilled in the art, and therefore need not be described herein. The Login Command starts the iSCSI Login Phase. Within the Login Phase, negotiation is carried on through parameters of the Login Command and Response and optionally through intervening Text Commands and Responses.

The Login Response concludes the Login Phase. Once suitable authentication has occurred, the target may authorize the initiator to send SCSI commands. The target indicates a successful authentication and authorization by sending a login response with "accept login". Otherwise, it sends a response with a "login reject", indicating a session is not established. It is expected that iSCSI parameters will be negotiated after the security association protocol is established if there is a security association. The login message includes a session ID—composed with an initiator part ISID and a target part TSID. For a new session, the TSID is null. As part of the response, the target will generate a TSID. Session specific parameters can be specified only for the first login of a session (TSID null)(e.g., the maximum number of connections that can be used for this session). Connection specific parameters (if any) can be specified for any login. Thus, a session is operational once it has at least one connection. Any message except login and text sent on a TCP connection before this connection gets into full feature phase at the initiator should be ignored by the initiator. Any message except login and text reaching a target on a TCP connection before the full feature phase must be silently ignored by the target.

During login and thereafter some session or connection parameters are negotiated through an exchange of textual information. In "list" negotiation, the offering party will send a list of values for a key in its order of preference. The responding party will answer with a value from the list. The value "none" must always be used to indicate a missing function. However, none is a valid selection only if it was explicitly offered and it may be selected by omission (i.e.<key>:none may be omitted). The general format is: Offer-><key>:(<value1>,<value2>, . . . ,<valuen>) Answer-><key>:<valuex>In "numerical" negotiations, the offering and responding party state a numerical value. The result of the negotiation is key dependent (usually the lower or the higher of the two values).

Once the initiator is authorized to do so, the iSCSI session is in iSCSI full feature phase. The initiator may send SCSI commands and data to the various LUs on the target by wrapping them in iSCSI messages that go over the established iSCSI session. For SCSI commands that require data and/or parameter transfer, the (optional) data and the status for a command must be sent over the same TCP connection that was used to deliver the SCSI command (we call this "connection allegiance"). Thus if an initiator issues a READ command, the target must send the requested data, if any, followed by the status to the initiator over the same TCP connection that was used to deliver the SCSI command. If an initiator issues a WRITE command, the initiator must send the data, if any, for that command and the target must return R2T, if any, an the status over the same TCP connection that was used to deliver the SCSI command. However consecutive commands that are part of a SCSI linked commands task may use different connections—connection allegiance is strictly per-command and not per-task.

During iSCSI Full Feature Phase, the initiator and target may interleave unrelated SCSI commands, their SCSI Data and responses, over the session. Outgoing SCSI data (initiator to target—user data or command parameters) will be sent as either solicited data or unsolicited data. Solicited data are sent in response to Ready To Transfer (R2T) PDUs. Unsolicited data can be part of an iSCSI command PDU ("immediate data") or an iSCSI data PDU. An initiator may send unsolicited data (immediate or in a separate PDU) up to the SCSI limit (initial burst size—mode page 02h). All subsequent data have to be solicited.

Targets operate in either solicited (R2T) data mode or unsolicited (non R2T) data mode. An initiator must always honor an R2T data request for a valid outstanding command (i.e., carrying a valid Initiator Task Tag) and provided the command is supposed to deliver outgoing data and the R2T specifies data within the command bounds. It is considered an error for an initiator to send unsolicited data PDUs to a target operating in R2T mode (only solicited data). It is also an error for an initiator to send more data whether immediate or as a separate PDU) than the SCSI limit for initial burst.

An initiator may request, at login, to send immediate data blocks of any size. If the initiator requests a specific block size the target must indicate the size of immediate data blocks it is ready to accept in its response. Beside iSCSI, SCSI also imposes a limit on the amount of unsolicited data a target is willing to accept. The iSCSI immediate data limit must not exceed the SCSI limit. A target should NOT silently discard data and request retransmission through R2T. Initiators must NOT perform any score boarding for data and the residual count calculation is to be performed by the targets. Incoming data is always implicitly solicited. SCSI Data packets are matched to their corresponding SCSI commands by using Tags that are specified in the protocol. Initiator tags for pending commands are unique initiator-wide for a session.

Target tags are not strictly specified by the protocol—it is assumed that those will be used by the target to tag (alone or in combination with the LUN) the solicited data. Target tags are generated by the target and "echoed" by the initiator. The above mechanisms are designed to accomplish efficient data delivery and a large degree of control over the data flow. iSCSI initiators and targets must also enforce some ordering rules to achieve deadlock-free operation. Unsolicited data must be sent on every connection in the same order in which commands were sent. If the amount of data exceeds the amount allowed for unsolicited write data, the specific connection must be stalled—i.e., no more unsolicited data will not be on this connection until the specific command has finished sending all its data and has received a response.

However new commands can be sent on the connection. A target receiving data out of order or observing a connection violating the above rules must terminate the session. Each iSCSI session to a target is treated as if it originated from a different and logically independent initiator.

Connection termination is assumed an exceptional event. Graceful TCP connection shutdowns are done by sending TCP FINs. Graceful connection shutdowns must only occur when there are no outstanding tasks that have allegiance to the connection. A target should respond rapidly to a FIN from the initiator by closing it's half of the connection after waiting for all outstanding tasks that have allegiance to the connection to conclude and send their status. Connection termination with outstanding tasks may require recovery actions. Connection termination is also required as prelude to recovery. By terminating a connection before starting recovery, initiator and target can avoid having stale PDUs being received after recovery. In this case, the initiator will send a LOGOUT request on any of the operational connections of a session indicating what connection should be terminated.

Text string names are used in iSCSI to:—provide explicitly a transportID for the target to enable the latter to recognize the initiator because the conventional IP—address and port pair is inaccurate behind firewalls and NAT devices (key—initiator)—provide a targetID for simple configurations hiding several targets behind an IP—address and port (key—target)—provide a symbolic address for source and destination targets in third party commands; those will be mapped into SCSI addresses by a SCSI aliasing mechanism The targetID must be presented within the login phase. In order to enable implementers to relate them to other names and name handling mechanisms the following syntax for names should be used<domain-name>[/modifier] Where domain-name follows DNS (or dotted IP) rules and the modifier is an alphanumeric string (N.B. the whole pattern follows the URL structure). Some mapped names for third party command use might have to include a port number. For those the following syntax should be used:<domain-name>[:[port][/modifier] The text to address transformation, wherever needed, will be performed through available name translation services (DNS servers, LDAP accessible directories etc.). To enable simple devices to operate without name-to-address conversion services the following conventions should be used: A domain name that contains exactly four numbers separated by dots (.), where each number is in the range 0 through 255, will be interpreted as an IPv4 address. A domain name that contains more than four, but at most 16 numbers separated by dots (.), where each number is in the range 0 through 255, will be interpreted as an Ipv6 address. Examples of IPv4 addresses/names: 10.0.0.1/ diskfarm1 10.0.0.2 Examples of Ipv6 addresses/names 12.5.7.10.0.0.1/tapefarm1 12.5.6.10.0.0.2 For management/ support tools as well as naming services that use a text prefix to express the protocol intended (as in http:// or ftp://) the following form may be used: [:port][/modifier]"iSCSI:// <domain-name>[:port][/modifier].

When a target has to act as an initiator for a third party command, it may use the initiator name it learned during login as required by the authentication mechanism to the third party. To address targets and logical units within a target, SCSI uses a fixed length (8 bytes) uniform addressing scheme; sometimes referred to herein as SCSI reference addresses (SRA). To provide the target with the protocol specific addresses iSCSI relies on the SCSI aliasing mechanism (work in progress in T10). The aliasing support enables an initiator to associate protocol specific addresses with SRAs; the later can be used in subsequent commands. For iSCSI, a protocol specific address is a TCP address and a selector.

Framing Justification iSCSI presents a mapping of the SCSI protocol onto TCP. This encapsulation is accomplished by sending iSCSI PDUs that are of varying length. Unfortunately, TCP does not have a built-in mechanism for signaling message boundaries at the TCP layer. iSCSI overcomes this obstacle by placing the message length in the iSCSI message header. This serves to delineate the end of the current message as well as the beginning of the next message. In situations where IP packets are delivered in-order from the network, iSCSI message framing is not an issue (messages are processed one after the other). In the presence of IP packet reordering (e.g. frames being dropped), legacy TCP implementations store the "out of order" TCP segments in temporary buffers until the missing TCP segments arrive, upon which the data must be copied to the application buffers. In iSCSI it is desirable to steer the SCSI data within these out of order TCP segments into the pre-allocated SCSI buffers rather than store them in temporary buffers. This decreases the need for dedicated reassembly buffers as well as the latency and bandwidth related to extra copies. Unfortunately, when relying solely on the "message length in the iSCSI message" scheme to delineate iSCSI messages, a missing TCP segment that contains an iSCSI message header (with the message length) makes it impossible to find message boundaries in subsequent TCP segments. The missing TCP segment(s) must be received before any of the following segments can be steered to the correct SCSI buffers (due to the inability to determine the iSCSI message boundaries). Since these segments cannot be steered to the correct location, they must be save in temporary buffers that must then be copied to the SCSI buffers. To reduce the amount of temporary buffering and copying, synchronization information (markers) is placed at fixed intervals in the TCP stream to enable accelerated iSCSI/TCP implementations to find and delineate iSCSI messages in the presence of IP packet reordering. The use of markers is negotiable. Initiator and target may indicate their readiness to receive and/or send markers, during login, separately for each connection. The default is NO. In certain environments a sender not willing to supply markers to a receiver willing to accept markers may suffer from a considerable performance degradation.

At fixed intervals in the TCP byte stream, a "Marker" is inserted. This Marker indicates the offset to the next iSCSI message header. The Marker is eight bytes in length, and contains two 32-bit offset fields that indicate how many bytes to skip in the TCP stream to find the next iSCSI message header. There are two copies of the offset in the Marker to handle the case where the Marker straddles a TCP segment boundary. Each end of the iSCSI session specifies during login the interval of the Marker it will be receiving, or disables the Marker altogether. If a receiver indicates that it desires a Marker, the sender should provide the Marker at the desired interval. The marker interval (and the initial marker-less interval) are counted in terms of the TCP-sequence-number. Anything counted in the TCP sequence-number is counted for the interval and the initial marker-less interval. Markers must point to a 4 byte word boundary in the TCP stream—the last 2 bits of each marker word are reserved and will be considered 0 for offset computation. Padding iSCSI PDU payloads to 4 byte word boundaries simplifies marker manipulation.

When a large iSCSI message is sent, the TCP segment(s) containing the iSCSI header may be lost. The remaining TCP segment(s) up to the next iSCSI message need to be buffered (in temporary buffers), since the iSCSI header that indicates what SCSI buffers, the data is to be steered to was lost. To minimize the amount of buffering, it is recommended that the iSCSI PDU size be restricted to a small value (perhaps a few TCP segments in length). Each end of the iSCSI session specifies during login the maximum size of an iSCSI PDU it will accept.

To enable the connection setup including the login phase negotiation the negotiated marking will be started at negotiated boundary in the stream. The marker-less interval will not be less than 64 kbytes and the default will be 64 kbytes.

All multi-byte integers specified in formats defined herein are to be represented in network byte order (i.e., big endian). Any bits not defined should be set to zero. PDUs are padded to an integer number of 4 byte words. All iSCSI PDUs begin with a 48-byte header. Additional data appears, as necessary, beginning with byte 48. The fields of Opcode and Length appear in all iSCSI PDUs. In addition, the Initiator Task tag, Logical Unit Number, and Flags fields, when used, appear in the same location in the header.

When an initiator has submitted a SCSI Command with data passing from the initiator to the target (WRITE), the target may specify which blocks of data it is ready to receive. In general, the target may request that the data blocks be delivered in whatever order is convenient for the target at that particular instant. This information is passed from the target to the initiator in the Ready To Transfer (R2T) message. In order to allow write operations without R2T, the initiator and target must have agreed to do so by both sending the UseR2T:no key-pair attribute to each other (either during Login or through the Text Command/Response mechanism). An R2T may be answered with one or more iSCSI Data-out PDU with a matching Target Task Tag. If an R2T is answered with a single Data PDU the Buffer Offset in the Data PDU must be the same as the one specified by the R2T and the data length of the Data PDU must not exceed the Desired Data Length specified in R2T. If the R2T is answered with a sequence of Data PDUs the Buffer Offset and Length must be within the range of those specified by R2T, the last PDU should have the F bit set to 1, the Buffer Offsets and Lengths for consecutive PDUs should form a continuous non-overlapping range and the PDUs should be sent in increasing offset order. The target may send several R2T PDUs and thus have a number or data transfers pending. The present document does not limit the number of outstanding data transfers. However, the target should NOT issue overlapping R2T request (i.e. referring to the same data area). All outstanding R2T should have different Target Transfer Tags.

The login phase establishes an iSCSI session between initiator and target. It sets the iSCSI protocol parameters, security parameters, and authenticates initiator and target to each other. The login phase is implemented via login and text commands and responses only. The login command is sent from the initiator to target in order to start the login phase and the login response is sent from the target to the initiator to conclude the login phase. Text messages are used to implement negotiation, establish security and set operational parameters. The whole login phase is considered as a single task and has a single Initiator Task Tag (very much like the linked SCSI commands). The login phase sequence of commands and responses proceeds as follows:—Login command (mandatory)—Login Partial-Response (optional)—Text Command(s) and Response(s) (optional)—Login Final-Response (mandatory)

The login phase starts with a login request via a login command from the initiator to the target. The login request includes:—Protocol version supported by the initiator (currently 0.3)—Session and connection Ids-Security Parameters (if security is requested) and—Protocol parameters The target can answer in the following ways:—Login Response with Login Reject (and Final bit 1). This is an immediate rejection from the target causing the session to terminate. Causes for rejection are address rejection, local protection etc. Login reject with Final bit 0 is a format error.—Login Response with Login Accept with session ID and iSCSI parameters and Final bit 1. In this case, the target does not support any security or authentication mechanism and starts with the session immediately (enters full feature phase).

Login Response with Final bit 0 indicating the start of a authentication/negotiation sequence. The response includes the protocol version supported by the target and the security parameters (not iSCSI parameters, those will be returned only after security is established to protect them) supported by the target.

Figure 4A:
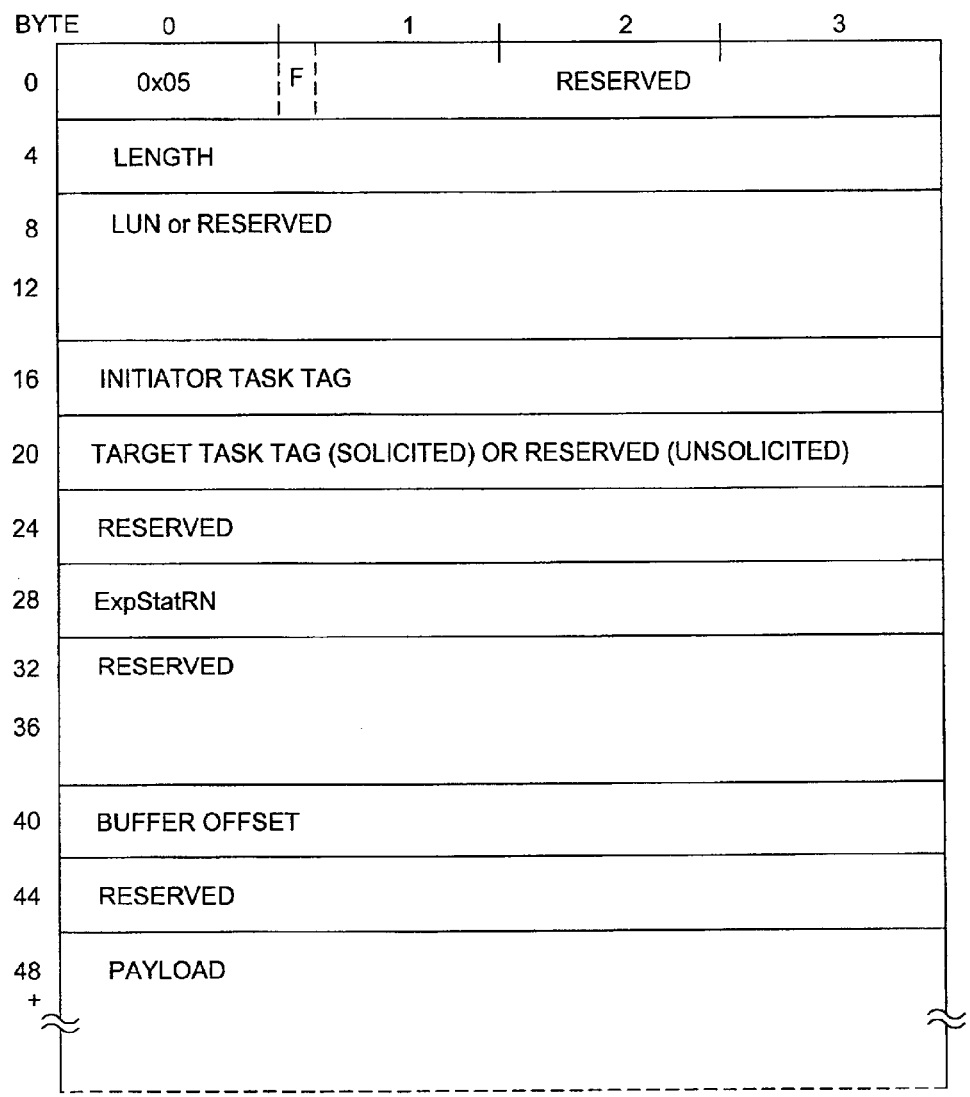
FIGS. 4A and 4B are diagram, which depict the packet formats for SCSI data Write (from initiator to target) and Read (from target to initiator) commands, respectively.
Figure 4B:
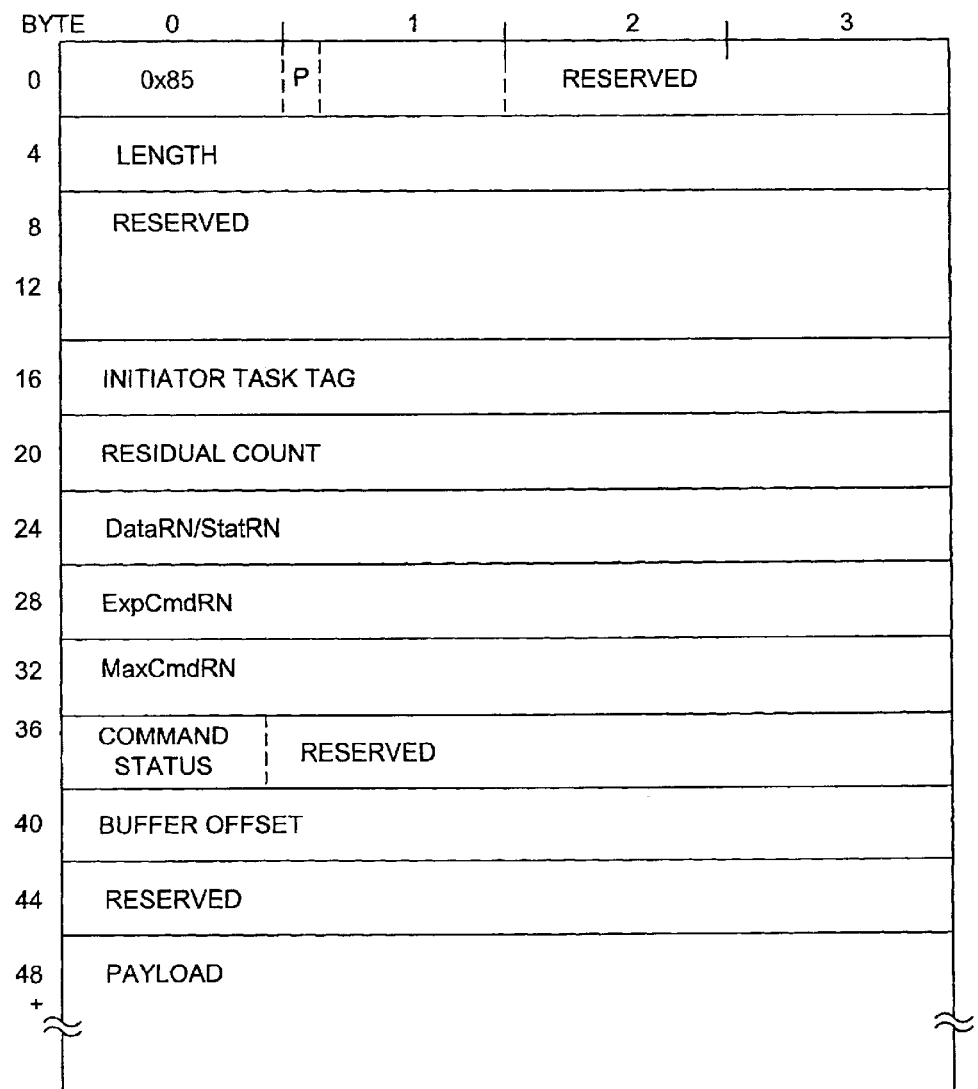

Reference is made briefly to FIGS. 4A and 4B, which show the packet formats for SCSI data Write (from initiator to target) and Read (from target to initiator) commands, respectively. Since these packet formats and their contents are known and documented, they need not be described herein in detail. Instead, only brief reference is made for completeness, and to facilitate a better understanding of certain aspects of the present invention (e.g., the addition of new iSCSI commands).

With regard to the F (final) bit (byte No. 1 of a SCSA data Write packet, this F bit is 1 for the last PDU of immediate data or the last PDU of a sequence answering a R2T. The length field (bytes 4–7) specifies the total number of bytes in the following payload. The Target Task Tag is provided to the target if the transfer is honoring a R2T. In this case, the Target Task Tag field is a replica of the Target Task Tag provided with the R2T. The Target Task Tag values are not specified by this protocol except that the all-bits-one value (0x'ffffffff') is reserved and means that the Target Task Tag is not supplied. If the Target Task Tag is provided then the LUN field must hold a valid value and consistent with whatever was specified with the command, else the LUN field is reserved.

The Buffer Offset field contains the offset of the following data against the complete data transfer. The sum of the buffer offset and length should not exceed the expected transfer length for the command.

On inbound data, the target may number (or sequence) the data packets to enable shorter recovery on connection failure. In case the target numbers data packets, the initiator MUST acknowledge them by specifying the next expected packet in a NOP-Out with the same Initiator Tag. Acknowledging NOP PDUs may be postponed for up to the number of incoming data PDUs negotiated at login. An explicit request for acknowledgement made by setting the P bit (in byte No. 1 of a SCSI data Read—FIG. 4B) must be honored.

Again, details regarding the foregoing commands are known and well documented, and thus need not be detailed herein. Other commands and details regarding the proposed iSCSI protocol are published and known by persons skilled in the art, and therefore need not be described herein in order to gain an understanding of the concepts and operation of the present invention. Indeed, the foregoing discussion has been provided merely for purposes of illustration, and is not deemed to be limiting upon the scope and spirit of the present invention.

Figure 5:
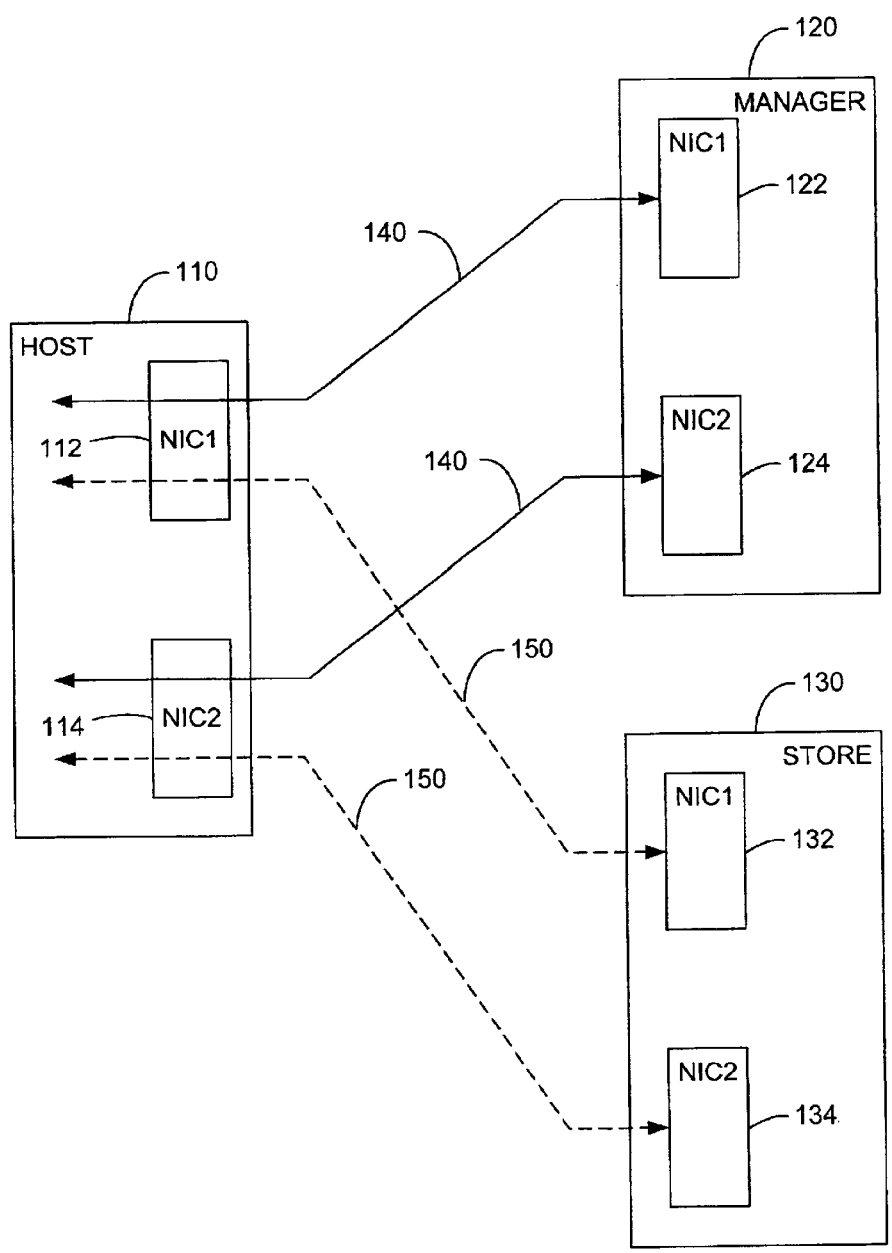
FIG. 5 is a diagram illustrating the concept of NIC allegiance between NICS on a host, manager, and data stores.
Figure 6:
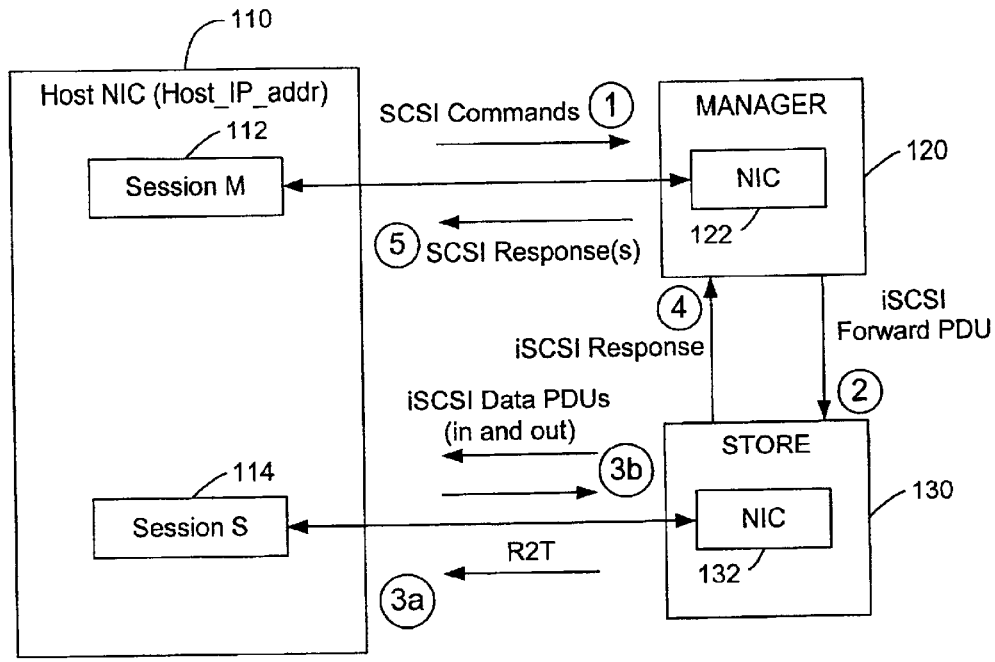
FIG. 6 is a diagram, which illustrates the basic signaling that takes place in accordance with the preferred embodiment of the present invention.

As summarized above, the present invention is generally directed to a system and method for implementing storage virtualization. Reference is now made to FIGS. 5 and 6, which are diagrams illustrating the operation and principal signaling of a system constructed in accordance with the present invention. For simplicity, the system illustrated in FIGS. 5 and 6 includes a host 110, a manager 120, and a single data store 130. As was previously illustrated in FIG. 1, these various components may inter-communicate over a computer network. In accordance with the preferred embodiment, there is "allegiance" between network interface cards (NICS) among the participating components. The diagram of FIG. 5 illustrates this concept. NIC allegiance refers to the notion that all protocol exchanges for a give command must happen on the same NIC. Thus, the data, status, and R2T transactions are all "allegiant" to the same NIC in question. In the illustrated embodiment, the host 110 sends, for example, a command on a given NIC to the manager 120. The host 110, however, receives the requested data directly from one or more data stores 130. These exchanges from the data store 130, however, take place on the same NIC that sent the command to the manager 120.

In this regard, the host 110, manager 120, and store 130 inter-communicate through "sessions" established between each of the components (or processes). As is known, such communications take place through NICS. In the diagram of FIG. 5, each component is illustrated as having two NICS. A first session 140 established between host 110 and manager 120 spans each of the two NICS 112 and 114 on the host. As illustrated, session 140 spans the same two NICS 122 and 124 on the manager. The second session 150 is established between the host 110 and store 130. In keeping with the "NIC allegiance" concept, this session spans both the NICS 112 and 114 on the host, as well as both the NICS 132 and 134 on the store 130. It should be appreciated, however, that the various data stores 130 and the manager 120 can participate equally well with only one NIC each. The example illustrated in FIG. 5, however, merely illustrates a higher performing storage virtualization implementation, where each session 140 and 150 has two connections on two NICS.

Reference is now made to FIG. 6, which illustrates the basic signaling that takes place in accordance with the preferred embodiment of the present invention. In the diagram of FIG. 6, two sessions (session M and session S) are illustrated. As previously described, before initiating the exchanges illustrated in FIG. 6, sessions and connections are first established through a login sequence. Since such a login sequence has been summarily described herein and will be further understood by persons skilled in the art, it need not be repeated at this point. Therefore, the transactions that are illustrated in the diagram of FIG. 6 assume that the TCP connections and sessions have been previously established through an appropriate login procedure.

With regard to the storage virtualization that is implemented in accordance with the teachings of the invention, a SCSI command is sent from a host (initiator) to a manager 120. It should be appreciated by persons in the art, the manager 120 is a software process that may be implemented on the same (or different) physical device as the host 110. The manager 120 receives and evaluates the SCSI command, and determines whether it should prepare and reply with an immediate response (to the initiator) or whether the SCSI command implicates one or more storage devices 130 (only one illustrated in FIG. 6). In this regard, and as is known, certain SCSI commands such as INQUIRY, REPORT LUNS, etc. do not implicate data stores, and therefore need not be forwarded to data stores. Other commands, however, such as Read and Write commands do implicate data stores. In accordance with the invention, such commands are forwarded by the manager to the various data stores 130.

In this regard, and in accordance with the preferred embodiment of the present invention, the manager 120 constructs a unique forwarding message to communicate with the implicated data stores. Preferably, this forwarding message is constructed in accordance with an iSCSI protocol. As previously mentioned here and above, various protocols have been proposed for adoption as a standard for iSCSI. However, no such standard has yet been adopted or put in place. Therefore, it should be appreciated that the messaging from the manager 120 to the various stores 130 of the present invention is not restricted to any given iSCSI protocol format. Instead, and in accordance with the preferred embodiment, the information communicated from the manager to the data store in the iSCSI forward message may take on a variety of formats. Indeed, in accordance with a broad aspect of the preferred embodiment, the forwarding command merely encapsulates a SCSI command that is sent to the data stores 130. It will, however, preferably include several specific items.

Figure 7:
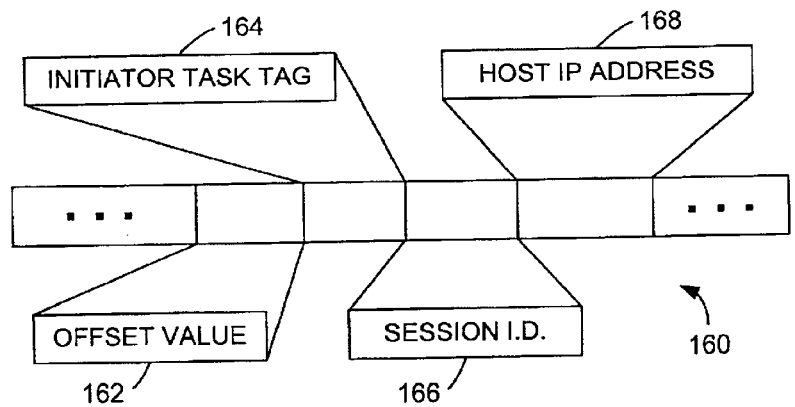
FIG. 7 is a diagram, which illustrates a message packet of one iSCSI Forward PDU.

In this regard, reference is made briefly to FIG. 7, which illustrates a message packet of one iSCSI Forward PDU. Again, various data fields and information may be contained within this message. In accordance with the preferred embodiment of the invention, however, the manager 120 includes four specific items in this message packet. One such item is an offset value 162. This offset value 162 is preferably a constant offset that the data store 130 should add to the "Buffer Offset" in its exchanges with the host 110 for R2T and SCSI Read PDUs. Similarly, the offset value is a value that the store should subtract from the "Buffer Offset" of SCSI Write Data PDUs that the store 130 receives from the host 110. The "Buffer Offset" value has been described above, and need not be discussed further herein.

Another value contained within the iSCSI Forward message 160 is an Initiator Task Tag 164. This data value is provided as part of the SCSI command received from the host 110. It has been described above, is known and understood by persons skilled in the art, and therefore need not be described further herein. The session identifier 166 is another data value contained within the message packet 160 sent from the manager 120 to the data store 130. The session identifier identifies the session on which the manager 120 received the present command (in the illustrated example Session M). This session identifier is quoted by the data store 130 in R2T and SCSI Read PDUs sent to the host 110. Finally, a fourth data value contained within the message packet 160 is the host IP address 168. This is the IP address of the host 110 corresponding to session M (of the illustrated example).

Thereafter, command and data transactions between the data stores 130 and host 110 take place. For example, the data store 130 may send an R2T PDU (denoted as transfer 3a) to the host if the command (sent from the host 110 to the manager 120) is a Write command. As illustrated, the store 130 may use Session S for communications with the initiator 110, which session is established on the same host IP address. The store 130 may also send and receive SCSI Read Data and Write Data PDUs (denoted as transfers 3b). The store 130 also uses Session S corresponding to the host IP address for these transfers. It should be appreciated that steps denoted as 3a and 3b may be repeated multiple times, depending on the I/O size and the buffering capabilities of the store 130. When the I/O is entirely completed, from the perspective of a given data store 130, the store 130 reports the completion with an appropriate response to the manager 120. This response encapsulates a SCSI response PDU, and is preferably in the form of an iSCSI response PDU to the manager 120. The store 130 preferably uses the Initiator Task Tag of the Forward PDU (transfer denoted by number 4) to report the result to the manager 120. In this regard, the forwarding command (denoted by transfer number 2) from the manager 120 to the store(s) 130 is similar in semantics to a "regular" iSCSI command, and therefore requires a regular iSCSI Response PDU as a response (denoted by transfer number 4).

Finally, once the manager 120 has received such a response from all of the data stores that were implicated by the original command (transfer denoted by number 1), then the manager 120 reports the I/O completion back to the host 110 using a SCSI response PDU (denoted as transfer 5).

A significant feature of the preferred embodiment relates to the bandwidth savings realized by the above-described signaling. In this respect, in systems previously proposed, each implicated data store 130 would send a status or response signal to the host 110 upon data transfer completion. As the number of implicated data stores increased, the responses increased accordingly, thereby degrading bandwidth. In contrast, the system of the preferred embodiment communicates only a single response (denoted by number 5) to the host 110.

Figure 8:
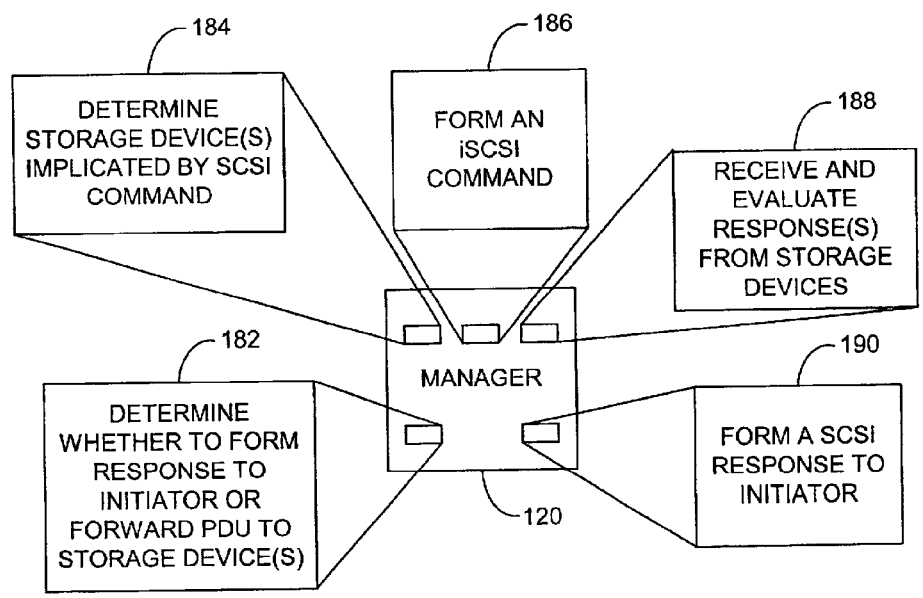
FIG. 8 is a diagram, which illustrates various components of a manager constructed in accordance with one embodiment of the invention.

Having described the principal signaling and data transfers of the preferred embodiment, reference is now made briefly to FIG. 8, which illustrates various components of a manager 120 constructed in accordance with one embodiment of the invention. As previously mentioned, the manager 120 is preferably a software process. In this regard, the diagram of FIG. 8 illustrates various functional components (or logic) that comprise the manager 120. It should be appreciated that the functionality of these various components may be implemented or realized in different ways. One way of implementing or realizing the functionality illustrated in FIG. 8 is through the implementation of segments of computer code that are configured to carry out the stated functions.

As previously discussed, the manager 120 receives commands from a host or initiator 110. For each such command, the manager 120 determines whether to form a direct response to the initiator, or whether to form a forward PDU to various storage devices that are implicated by the command (182). Implicit in this functionality, the manager must determine whether the command received from the initiator is a command that, indeed, implicates one or more storage devices. If so, the manager 120 must determine (184) the various storage devices that are implicated by the command. The manager then forms an iSCSI command (186) that is communicated to each of the implicated storage devices. As discussed in connection with FIGS. 6 and 7, this iSCSI command includes additional pieces of data, such as an offset value 162, Initiator Task Tag 164, Session ID 166, and Host IP address 168. Once this information has been communicated to the various storage devices, the storage devices individually communicate with the host until all requested data transactions are completed. Thereafter, each of the implicated storage devices communicates an appropriate response back to the manager 120 (again, preferable an iSCSI response). The manager, therefore, includes logic to receive and evaluate these various responses (188). The manager 120 further includes logic to form a SCSI response that is communicated back to the initiator (190) after all responses have been received from the various implicated data storage devices.

It will be appreciated by persons skilled in the art that the manager 120 of the illustrated embodiment can be implemented in hardware, software, firmware, or a combination thereof. In the preferred embodiment(s), the manager is implemented in software or firmware that is stored in a memory and that is executed by a suitable instruction execution system. If implemented in hardware, as in an alternative embodiment, the can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 9:
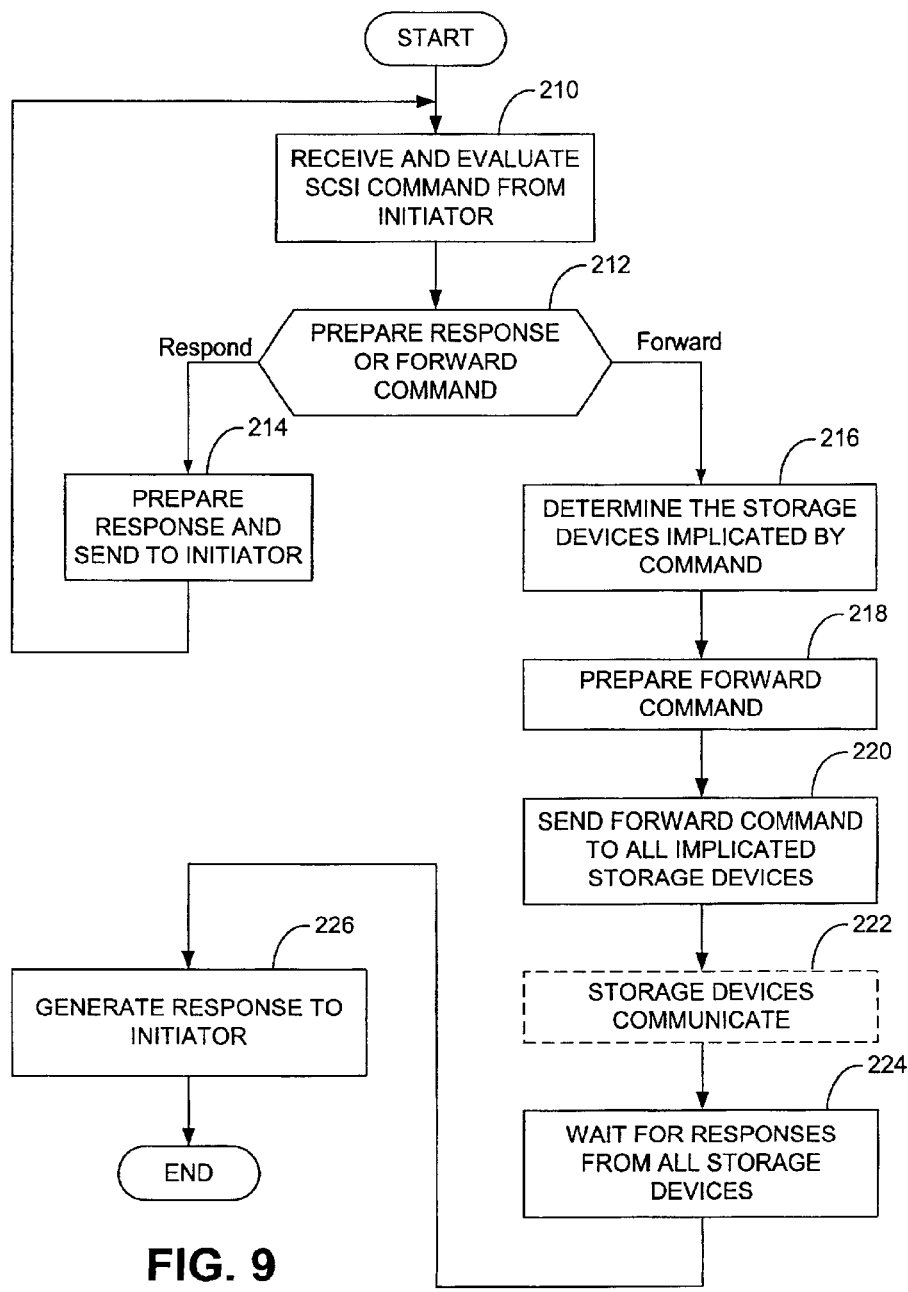
FIG. 9 is a flowchart illustrating certain steps in a methodology of an embodiment of the present invention.

Having described the operation of a system constructed in accordance with one aspect of the present invention, reference is now made to FIG. 9, which is a flowchart illustrating certain steps in a methodology of an embodiment of the present invention. Specifically, the flowchart illustrates the principal steps undertaken at the manager in carrying out the signaling and methodology of one embodiment of the invention. In accordance with a preferred methodology, the manager receives and evaluates a SCSI command transmitted from a host (initiator) (step 210). Upon evaluating this SCSI command, the manager must determine (step 212) whether to prepare a response directly to the host, or to forward the SCSI command to one or more implicated data storage devices. If the determine of step 212 is to prepare a direct response, then the manager prepares a response and sends it directly to the initiator (step 214). Otherwise, the manager determines which storage devices are implicated by the command received from the initiator (step 216). The manager then prepares an appropriate forwarding command to each of these implicated data storage devices (step 218). As previously mentioned, among other information, this forwarding command includes additional items such as an offset value, an Initiator Task Tag, a session identifier, and Host IP address. Appropriate forward commands are then communicated to all implicated storage devices (step 220). Thereafter, the various storage devices communicate directly with the initiator (step 222). During this time, the manager waits to receive responses from the various storage devices. As each storage device completes its communication with the initiator, they individually respond to the manager. The manager waits to receive responses from all of the implicated data storage devices (step 224). Once all such responses have been received, the manager generates and transmits an appropriate response to the initiator (step 226).

The process descriptions or blocks illustrated in the flow chart of FIG. 9 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Having described a preferred embodiment of the present invention, it will be appreciated that a variety of design implementation details and alternatives may be practiced consistent with the scope and spirit of the present invention. However, a recitation of such details need not be provided herein in order for persons skilled in the art to understand and practice the invention. Briefly, however, such details include the fact that the manager should present an iSCSI initiator interface to the various data stores, while presenting an iSCSI target interface to the host. When a login session is created between the manager and an initiator, the manager may report all of the data stores that it is virtualizing. Upon failure to establish or sustain an iSCSI session with any of the data stores or the manager, an initiator should logout and re-login with all the stores and manager, beginning the re-login process with the manager. Likewise, upon failure to establish or sustain an iSCSI session with any of the data stores, a manager may force a logout with the initiator. This forced logout causes the initiator to take recognition of the new set of data stores upon establishing a new session with the manager. An initiator may not keep permanent records of the data stores being virtualized, since they could, and likely will, change from session to session with manager.

Figure 10:
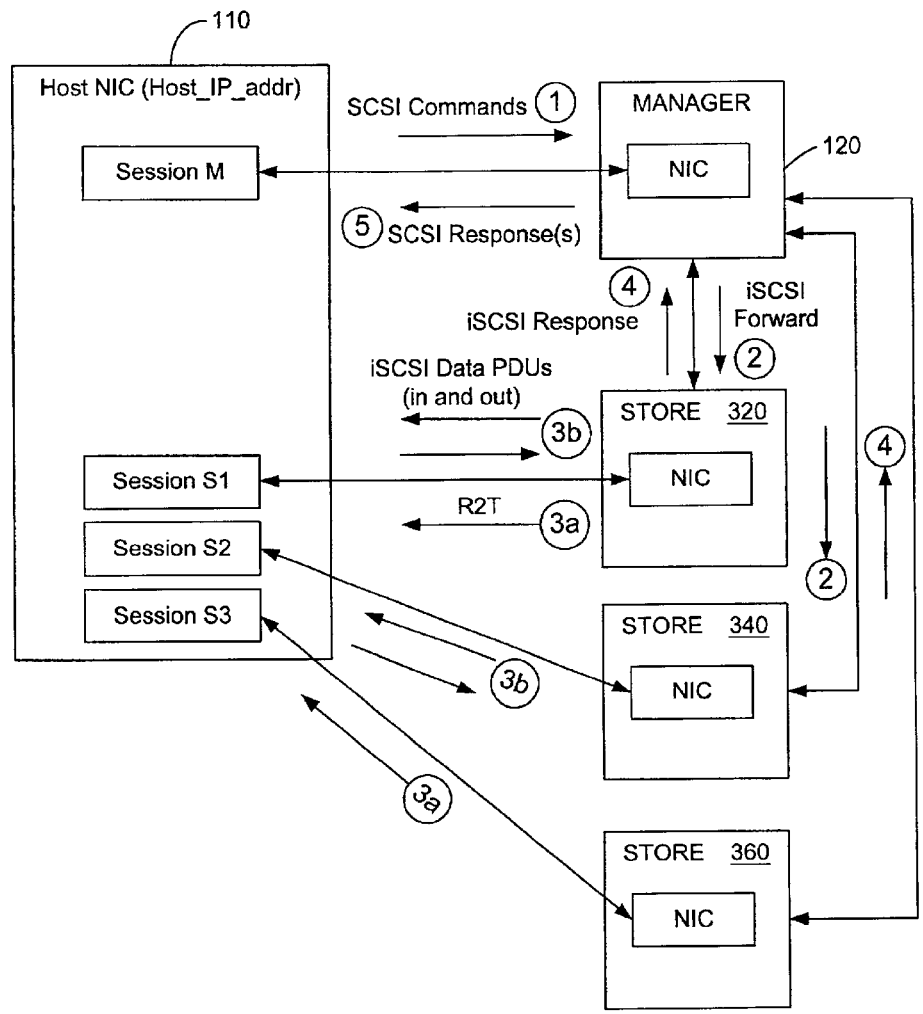
FIG. 10 is a diagram similar to FIG. 6, but illustrating the signaling among components where more than one data storage device is implicated.

Finally, reference is made to FIG. 10, which is a diagram similar to FIG. 6, but illustrating the signaling among components where more than one data storage device is implicated. In this regard, the example of FIG. 6 was provided illustrating only a single data store, to present simplicity in the illustration. This diagram has been simplified for purposes of illustration (e.g., illustrating a single NIC in the manager 120 and stores 320, 340, and 360). However, the concept of NIC allegiance, previously discussed, applies in such a system as well.

As can be seen from the diagram of FIG. 10, where three data storage devices 320, 340, and 360 are implicated, the overall signaling is essentially the same. Briefly, a SCSI command is communicated from a host 110 to a manager 120. In response, and assuming the SCSI command implicates three data storage devices 320, 340, and 360, the manager 120 generates iSCSI Forward PDUs (designated by transfer number 2) to each of the data stores. The respective data stores 320, 340, and 360, thereafter individually communicate directly with the host 110. Once the communications between the host and respective data stores are complete, each data store generates an appropriate response (designated by number 4) that is communicated to the manager 120. Once all of these responses have been received by the manager 120, the manager 120 formulates a single, appropriate response (designated by number 5) that is communicated to the host 110.

What is claimed is:

1. In a system having an initiator and at least one storage device, a manager for virtualizing storage among the at least one storage device comprising:
   logic configured to determine, based upon a SCSI command received from the initiator, which of the data storage devices are implicated by the SCSI command;
   logic configured to form an iSCSI command that is sent to each of the implicated storage devices;
   logic configured to receive an iSCSI response from each of the implicated storage devices, after each of the storage devices has completed its implicated data transactions with the initiator; and
   logic configured to form a SCSI response that is sent to the initiator.

2. The system as defined in claim 1, wherein the logic configured to form a SCSI response forms the response that is inferred by aggregation of independent responses from the storage devices.

3. The system as defined in claim 1, wherein the manager includes program code configured to execute a software process.

4. The system as defined in claim 1, further including logic configured to evaluate the SCSI command received from the initiator, wherein the logic configured to evaluate is further configured to examine an IP (Internet Protocol) address of the initiator.

5. The system as defined in claim 1, further including logic configured to determine, based upon the SCSI command received from the initiator, whether to form an iSCSI command to be sent to storage devices or form an immediate response to be sent to the initiator.

6. The system as defined in claim 1, wherein the iSCSI command sent to each of the implicated storage devices includes an offset value, which specifies an offset that the storage device receiving the iSCSI command modifies a Buffer Offset value that is contained in a protocol defining communications between the storage device and the initiator.

7. The system as defined in claim 6, wherein the offset value is added to the Buffer Offset value in communications with the initiator for R2T (request to transfer) and SCSI Read PDUs (protocol data units).

8. The system as defined in claim 6, wherein the offset value is subtracted from the Buffer Offset value in SCSI Write Data PDUs that the storage device receives from the initiator.

9. The system as defined in claim 1, wherein the iSCSI command sent to each of the implicated storage devices includes an Initiator Task Tag that was communicated from the initiator to the manager in the SCSI command.

10. The system as defined in claim 1, wherein the iSCSI command sent to each of the implicated storage devices includes a session identifier of the session on which the manager received the SCSI command.

11. The system as defined in claim 1, wherein the iSCSI command sent to each of the implicated storage devices includes an IP (Internet Protocol) address of the initiator.

12. In a system having an initiator and at least one storage device, a method for virtualizing storage among the at least one storage device comprising:
    determining, based upon a SCSI command received by a manager from the initiator, which of the data storage devices are implicated by the SCSI command;
    forming an iSCSI command that is sent from the manager to each of the implicated storage devices;
    receiving at the manager a SCSI response from each of implicated storage devices, after each of the storage devices has completed its implicated data transactions with the initiator; and
    forming a SCSI response that is sent by the manager to the initiator.

13. The method as defined in claim 12, further including the step of evaluating an IP (Internet Protocol) address of the initiator.

14. The method as defined in claim 12, further including the step of determining, based upon the SCSI command received from the initiator, whether to form an iSCSI command to be sent to storage devices or form a direct response to be sent to the initiator.

15. The method as defined in claim 12, wherein the step of forming the iSCSI command sent to each of the implicated storage devices includes providing an offset value, which specifies an offset that the storage device receiving the iSCSI command modifies a Buffer Offset value that is contained in a protocol defining communications between the storage device and the initiator.

16. The method as defined in claim 15, wherein the offset value is added to the Buffer Offset value in communications with the initiator for R2T (request to transfer) and SCSI Read PDUs (protocol data units).

17. The method as defined in claim 15, wherein the offset value is subtracted from the Buffer Offset value in SCSI Write Data PDUs that the storage device receives from the initiator.

18. The method as defined in claim 12, wherein the step of forming an: iSCSI command sent to each of the implicated storage devices includes providing an Initiator Task Tag that was communicated from the initiator to the manager in the SCSI command.

19. The method as defined in claim 12, wherein the step of forming an iSCSI command sent to each of the implicated storage devices includes providing a session identifier of the session on which the manager received the SCSI command.

20. The method as defined in claim 12, wherein the step of forming an iSCSI command sent to each of the implicated storage devices includes providing an IP (Internet Protocol) address of the initiator.

21. In a system having an initiator and at least one storage device, a manager for virtualizing storage among the at least one storage device comprising:

means for determining, based upon a SCSI command received from the initiator, which of the data storage devices are implicated by the SCSI command;

means for forming an iSCSI command that is sent to each of the implicated storage devices;

means for receiving a SCSI response from each of the implicated storage devices, after each of the storage devices has completed its implicated data transactions with the initiator; and means for forming a SCSI response that is sent to the initiator.

22. In a system having an initiator and at least one storage device, a method for virtualizing storage among the at least one storage device comprising:

determining, based upon a command having a defined protocol received by a manager from the initiator, which of the data storage devices are implicated by the command, wherein the defined protocol is one defining a family of interfaces for requesting service from input/output devices;

forming a unique protocol command that is sent from the manager to each of the implicated storage devices;

receiving at the manager a response having the unique protocol from each of the implicated storage devices, after each of the storage devices has completed its implicated data transactions with the initiator; and forming a response having the defined protocol that is sent by the manager to the initiator.

23. The method as defined in claim 22, wherein the step of forming a unique protocol command that is sent from the manager to each of the storage devices forms a protocol command that encapsulates a SCSI protocol.

* * * * *

UNITED STATES PATENT AND TRADEMARK OFFICE
CERTIFICATE OF CORRECTION

PATENT NO. : 6,845,403 B2 Page 1 of 1
APPLICATION NO. : 09/999026
DATED : January 18, 2005
INVENTOR(S) : Mallikarjun B. Chadalapaka It is certified that error appears in the above-identified patent and that said Letters Patent is hereby corrected as shown below:

IN THE CLAIMS

Column 19, line 6, after "forming an" delete ":"

Signed and Sealed this

Nineteenth Day of June, 2007

JON W. DUDAS
*Director of the United States Patent and Trademark Office*